United States Patent
Groch et al.

[11] 3,979,818
[45] *Sept. 14, 1976

[54] METHOD OF THERMALLY INSULATING PIPE

[75] Inventors: Steve W. Groch; Harold F. Jarvis, both of Moffat, Canada

[73] Assignee: Shaw Pipe Industries Ltd., Rexdale, Canada

[ * ] Notice: The portion of the term of this patent subsequent to Apr. 15, 1992, has been disclaimed.

[22] Filed: Oct. 11, 1974

[21] Appl. No.: 514,223

Related U.S. Application Data

[63] Continuation of Ser. No. 257,844, May 30, 1972, Pat. No. 3,877,136.

[52] U.S. Cl. .............................. 29/455 R; 29/458; 138/149; 156/78; 156/187; 156/195; 264/46.5
[51] Int. Cl.² .................. B21D 39/00; B23P 19/04
[58] Field of Search ............. 29/455, 458 X, 460, 477.3; 138/149; 156/78 X, 79, 162, 187, 195; 264/46.5

[56] References Cited
UNITED STATES PATENTS

| | | | |
|---|---|---|---|
| 3,118,800 | 1/1964 | Snelling | 156/79 |
| 3,434,502 | 3/1969 | Snelling | 138/149 X |
| 3,480,493 | 11/1969 | Bauer et al. | 156/78 |

*Primary Examiner*—Charlie T. Moon

[57] ABSTRACT

A method of thermally insulating pipe comprises rotating the pipe at a uniform speed about a substantially horizontal axis while applying a polyurethane foam mix to the surface of the pipe progressively along its length, simultaneously forming a metal tube of larger diameter than the pipe, the tube being progressively extended coaxially with the pipe and progressively enveloping the newly coated surface of the pipe, and maintaining the pipe at a temperature at which the mix constituents will react to form a foamed mass enveloping the pipe and filling the space between the pipe surface and the tube.

9 Claims, 6 Drawing Figures

METHOD OF THERMALLY INSULATING PIPE

This application is a continuation of our copending application Ser. No. 257844, filed May 30, 1972, now U.S. Pat. No. 3,877,136, for "Method of Thermally Insulating Pipe."

This invention relates to a method of thermally insulating pipe. The method described herein is especially suitable for applying thermal insulation to steel pipe sections which are to be assembled to form pipelines for natural gas and oil. It will be appreciated, however, that the method is generally applicable to the coating of straight pipe sections which may be used in other applications.

In the case of an oil pipeline, it is frequently necessary to provide thermal insulation to prevent heat loss from the oil which would increase the viscosity of the oil and so place an excessive demand on the oil pumping equipment. Besides providing an insulating coating, it is usually necessary to provide a tough outer casing or sheath to protect the insulation during handling and installation of the pipe section, and to prevent ingress of moisture and bacteria which would cause deterioration of the insulating material. The casing must be capable of withstanding low temperatures and at the same time must provide adequate support for the pipe.

In one existing method of coating a pipe section, a foamed plastic material is molded directly onto the pipe surface using a stationary box-like mold through which the pipe extends, the mold being moved stepwise along the pipe as successive batches of the foamed plastic material are molded onto successive lengths of pipe. This method has the limitation that a given mold box, and the associated molding unit for molding an outer sheath, will serve for only one diameter of pipe and for only one thickness of the insulating layer. Where different pipe diameters are involved or different insulation thicknesses are required, it is necessary to provide mold boxes and molding units of different dimensions. Moreover, difficulties are encountered when this method is applied to pipes of large diameter, say 3 or 4 feet.

In copending U.S. Pat. application Ser. No. 36,354, filed May 11, 1970, now U.S. Pat. No. 3,687,765, by Peter M. Maclean et al, there is described an alternative method of thermally insulating pipe which comprises spraying a urethane foam mix onto the surface of the pipe progressively along its length, to build up a uniform layer or polyurethane foam enveloping the pipe, and subsequently sheathing the coated pipe in a layer of tough polymeric material such as high density polyethylene. This method has the particular advantage that the strength of the coating is uniform in the direction perpendicular to the surface of the pipe. There are two limitations to this method, however. First, since the outer sheath is applied directly to the foam insulating layer, it is very difficult to ensure that the insulating characteristics and the outside diameter of the product are uniform along the length of the product, Second, the outer sheath does not have the desired strength for certain applications.

It is an object of the present invention to provide a method of providing a thermally insulated pipe having a metallic outer sheath, which method is readily applicable to pipes of different diameters.

The method according to the present invention comprises rotating the pipe at a uniform speed about a substantially horizontal axis while frothing a plastic foam mix onto the surface of the pipe progressively along its length, simultaneously forming a self-supporting and shape-retaining metal tube of larger diameter than the pipe by continuously feeding a metal strip having parallel edges in a direction transverse to said axis and continuously coiling the strip along a helical path while joining together adjacent convolutions of the strip to form a moistureproof helical seam, the tube being progressively extended coaxially with the pipe and progressively enveloping the surface of the pipe to define therewith an annular space, and maintaining the pipe at a temperature at which the mix constituents will react to form a foamed mass enveloping the pipe and filling the annular space between the pipe surface and the tube. The mix may be a urethane foam mix.

"Frothing" is a term of art which refers to the practice of incorporating an unusually low boiling material into the final foam mixture, in a pressurized mixing chamber. When the foam mixture is discharged from the pressurized chamber, it expands instantly into a semi-liquid foam or froth.

The tube may be formed by continuously feeding a metal strip having parallel edges in a direction transverse to said axis, and continuously coiling the strip along a helical path while crimping together edge-overlapping convolutions of the strip to form a moistureproof helical seam.

In order that the invention may be readily understood, one embodiment thereof will now be described by way of example with reference to the accompanying drawings, in which.

Figure 1:
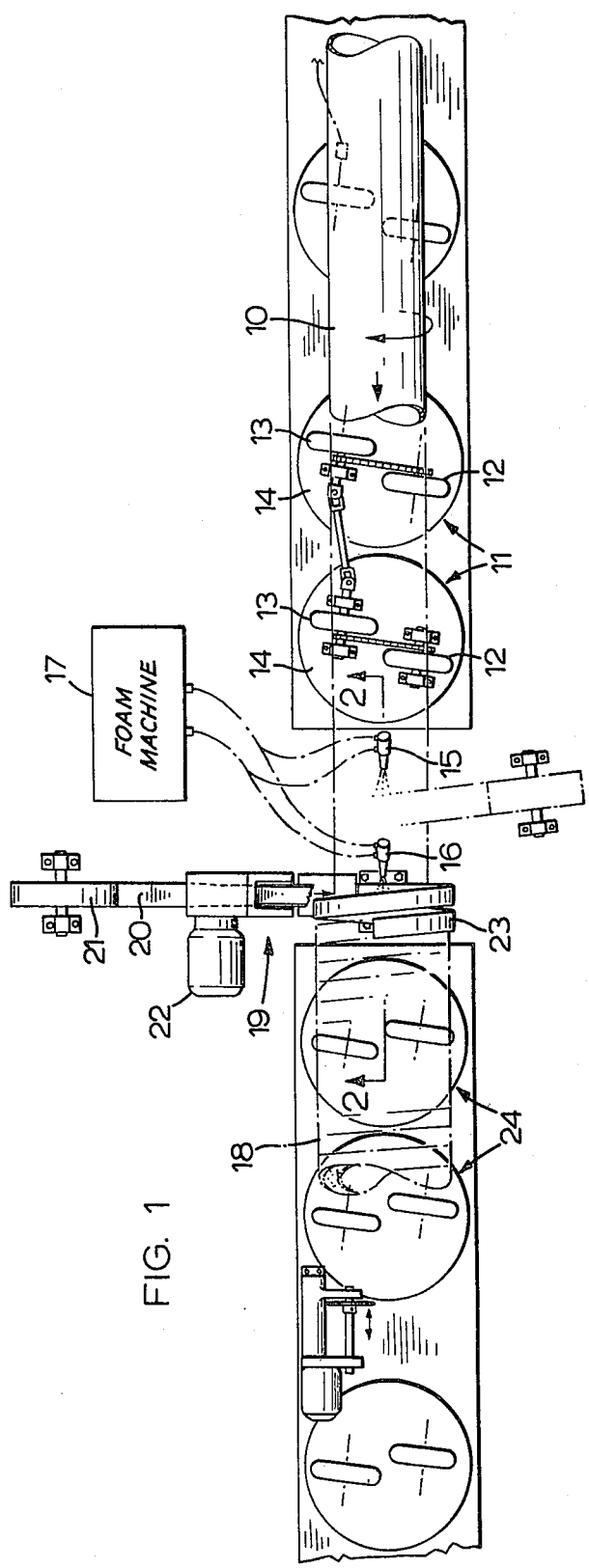
FIG. 1 is a partly diagrammatic plan view of an apparatus for performing the method of the invention.

The pipe 10 shown in FIG. 1 is a straight steel pipe of circular cross section to be used in the construction of an oil pipeline. The construction of the pipeline itself does not form part of the present invention, but it may be mentioned that in accordance with normal practice a plurality of such pipes after being coated with insulation material to within a short distance of their ends, are butt welded together at the site to form an extended line. The annular gaps in the insulation at the joins are filled by pairs of semiannular foamed plastic filling pieces, which are retained in place in the final assembly by tough sleeves which are shrink-fitted onto the joints.

In order to insulate the pipe, it is first placed with its axis substantially horizontal on a plurality of aligned drive assemblies 11, as indicated in FIG. 1. Each drive assembly comprises a pair of rubber-tired wheels 12, 13 whose axes are offset and parallel, the wheels being mounted in a turntable 14 and being driven from an electric eddy current clutch drive unit reduction gearing. The axes of the wheels are horizontal and slightly inclined to the pipe axis according to the orientation of the turntable. The pipe bears on the wheels which engage it frictionally. It will be seen that as the wheels are driven they rotate the pipe slowly about its horizontal axis and simultaneously feed the pipe longitudinally in the direction of its axis. Typically, and in the present example where the pipe is 20 inches diameter and the insulation 3 inches thick, the pipe is rotated at a uniform speed of 6 to 9 r.p.m. and advanced axially at the rate of 4¾ inches per revolution.

As the pipe is slowly rotated and advanced, a urethane foam mix is frothed onto the upper surface of the pipe from a nozzle located at a position higher than the pipe. In order to deliver the foam mix at a greater rate and so permit a more rapid speed of advance for the pipe, one or more additional nozzles such as 16 may be provided. The nozzle 15, (or each nozzle 15, 16,) should be positioned vertically above the pipe surface and oriented so as to direct the mix in a generally longitudinal direction at an angle of about 45° to the horizontal. The pipe surface is preheated and maintained at a temperature in the range 80° – 140°F, ideally in the range 125° – 130°F. The froth leaves the nozzle at about the same temperature, and so the ambient temperature should not be so low as to cause substantial cooling of the frothed mix prior to its reaching the pipe surface. An ambient temperature of about 60°F or higher is quite suitable, but temperatures below 40 F° should be avoided.

Successful results can be obtained using a static mix spray or pour apparatus of the type sold by Unifoam Industries Inc. of Toledo, Oh. under the trade term "LEMCO." In this apparatus, indicated at 17, the urethane foam mix components, namely an isocyanate component and a resin components, are fed separately to the spray nozzle when they are mixed prior to being frothed. The components are mixed in the proportions specified by the supplier according to the required physical properties of the insulation to be formed. The components are fed at temperatures of about 100° – 160°F respectively; the mix is frothed at a temperature in the range 115° – 140°F., preferably 125° – 130°F.

The foam mix on the pipe surface exhibits a cream time of about 3 seconds and a rise time of about 5 seconds. The tack free time, load holding time, and cure time are about 15 seconds, 15 minutes, and 2 hours, respectively.

By this method uniform layers of polyurethane foam of up to 6 inches thick and of the required density have been built up on the surfaces of pipes.

As so far described the method of the present invention is substantially the same as the method described in the above-mentioned application of Peter M. Maclean et al. However, the method of the present invention is further characterized in that a metallic tube 18 is formed simultaneously with the application of the foam mix to the pipe, the tube being progressively extended coaxially with the pipe so as to envelop progressively the newly coated surface of the pipe. The tube is formed using an automatic tube forming machine of the type known under the trademark "Spiro 800" and supplied by Spiro USA, Inc. The machine is indicated by the general reference 19 in the drawings. In the forming of the tube 18, a galvanized sheet steel strip 20 with parallel edges is fed from a reel 21 in a direction generally transverse to the axis of the pipe 10. The speed at which the strip is fed is determined by a hydraulic motor 22. The strip as it is fed is coiled by means of a die 23 and is caused to follow a helical path so that the edges of adjacent convolutions of the coiled strip overlap one another. The edge-overlapping convolutions are folded and crimped together in an interlocking manner in the die so as to form a moistureproof helical seam. Thus, as the mix constituents react, the resultant foamed mass envelops the pipe and fills the space between the pipe surface and the tube.

As the strip 20 is fed to the die and coiled, the tube 18 extends progressively in the direction of feed of the pipe, the rate of linear extension of the tube 18 being equal to the rate at which the pipe is advanced. As the tube 18 is extended longitudinally, it is supported on drive assemblies 24, which operate in the same manner as the drive assemblies 11 so as to rotate the tube while advancing it longitudinally. Clearly, the drive assemblies 11 and 24, the rate of feed of the foam mix from the machine 17 must be accurately controlled in accordance with the feed of the metal strip 20. The manner of control will subsequently be described with reference to FIG. 5.

The strip 20 is preferably preheated to the temperature of the pipe surface. The tubeforming machine 19 may incorporate a corrugating attachment by which corrugations are formed in the tube 18 as the tube is formed. It may be desirable, for certain applications, to provide a waterproof coating on one side of the strip so that the interior of the tube 18 is formed with a waterproof lining; or it may be desirable to precoat one side of the strip 20, and/or the surface of the pipe, with a wax or an epoxy resin, so as to prevent bonding of the polyurethane foam thereto.

Figure 3:
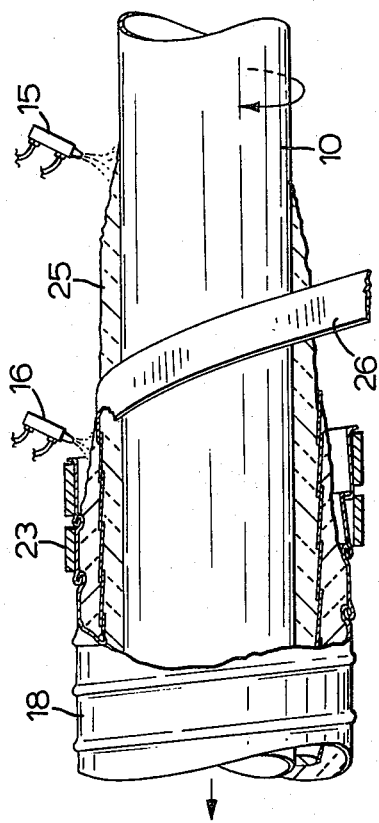
FIG. 3 is a view corresponding to FIG. 2 illustrating a step in a modification of the method.
Figure 2:
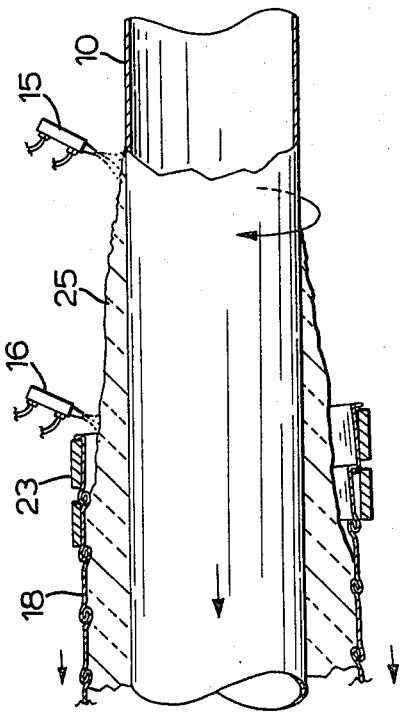
FIG. 2 is a section on line 2—2 in FIG. 1.
Figure 4:
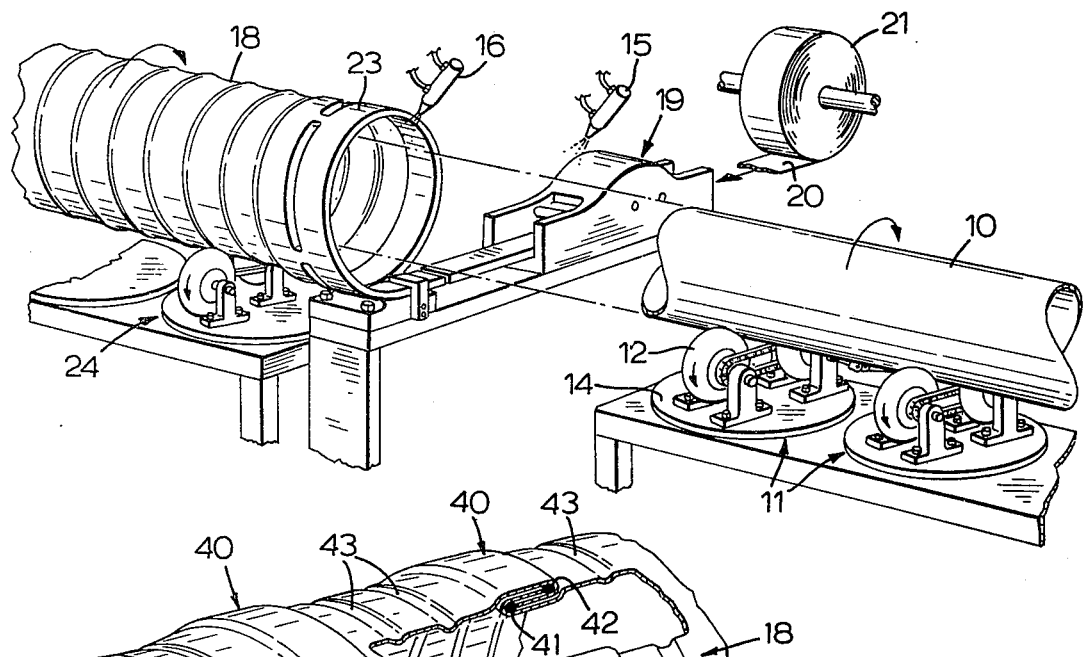
FIG. 4 is a simplified, general perspective, view of the apparatus shown in FIG. 1.

In the modification illustrated in FIG. 3, the foamed insulation coating 25 is reinforced with a reinforcing web of glass-reinforced thermoplastic material such as the glass fabric known by the trademark "Fiberglas". A first coating of the mix is frothed onto pipe from the spray nozzle 15, and the reinforcing web 26 is continuously wound onto the applied coating. Simultaneously the mix is frothed from the second spray nozzle 16 onto the portion of the pipe which has already been wrapped with the reinforcing web, so as to form a second, or outer, layer of mix 25'. Preferably the mix frothed from the second nozzle 16 will have a slower setting time than the mix frothed from the first nozzle. The tube 18 as it progressively envelops the pipe 10 defines an annular space between the pipe surface and the inner surface of the tube; the glass fabric reinforced foam plastic mix, constituted by the layers 25 and 25' and the reinforcing web 26, envelops the pipe within this space. The pipe is maintained at a temperature at which the constituents of the mix will react and so form a foamed mass filling the space.

As previously mentioned, it is necessary to coordinate the speed at which the pipe is advanced by the drive assemblies 11, the speed at which the final assembly is advanced by the drive assemblies 24, and the rate at which the mix is deposited onto the pipe from the nozzles 15, 16, with the rate at which the metal strip 20 is fed to the die 23. This is achieved in the following manner.

Figure 5:
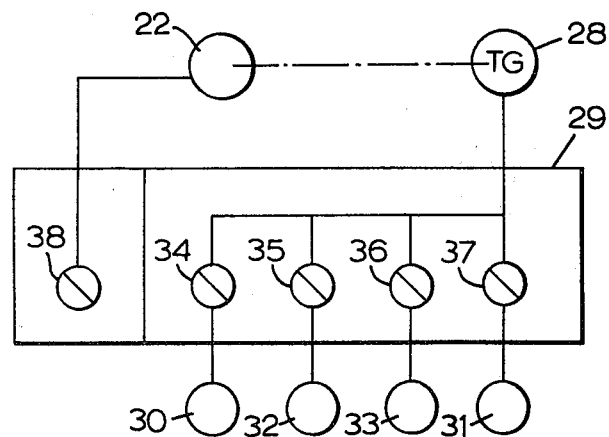
FIG. 5 is a diagrammatic representation of the apparatus showing the principal control elements therefor.

The drive assemblies 11 and 24 are driven from respective constant speed electric motors (one of the motors being shown at 27 in FIG. 1) through eddy current clutches. The eddy current clutches are controlled so that the output speeds are related to the input speeds from the motors. Referring to FIG. 5, the motor 22 of the tubeforming machine 19 drives a tachometer generator 28, which generates an output signal directly related to the motor speed. This output signal is taken to a control panel 29, and from it are derived the various control signals to be applied to the eddy current clutches 30, 31, and to eddy current clutches 32, 33 controlling the spray pumps which govern the rates at which the mix components are delivered from the respective spray nozzles 15, 16. Mounted on the control panel 29 are four control units each having a potentiometer control, 34, 35, 36, 37; by manual adjustment of the potentiometer controls the respective control signals can be independently adjusted in relation to the tachometer generator signal. The speed of the hydraulic motor 22, which thus governs the magnetic couplings provided by the clutches 30, 31, 32, 33, can also be adjusted manually by a potentiometer control 38 mounted on the control panel 29; the control 38 is thus a master control for the whole system.

In accordance with the desired rate of linear advance of the pipe, the speed of the hydraulic motor 22 is set by the control 38. This will determine the rate of feed of the strip 20, and hence the rate of advance of the outer tube 18. Clearly, the drive assemblies 24 must follow this speed exactly, for which purpose the eddy current cluth 30 is controlled in accordance with the tachometer generator signal through the control unit 34. The pipe 10 must also be advanced by the drive assemblies 11 at the same linear speed, but as the outside diameter of the pipe is less than that of the tube 18 the drive assemblies 11 must be controlled accordingly. The control unit 37 is therefore adjusted so that the drive assemblies 11 are locked to the hydraulic motor speed in the required manner. The rates at which the mix is delivered from the spray nozzles 15, 16 are also controlled in accordance with the speed of the hydraulic motor 22, the control units 35 and 36 being preset in accordance with the quantities of mix to be delivered per unit length of pipe.

In this way, by appropriate pre-adjustment of the controls 34, 35, 36, 37, the various drives in the apparatus are locked in the appropriate manner to the speed of the motor 22 which feeds the strip.

Figure 6:
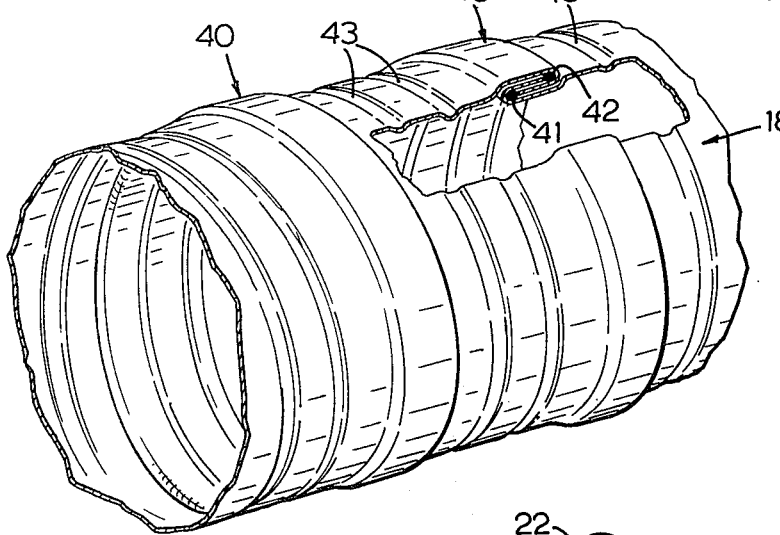
FIG. 6 is a fragmentary perspective view of the outer tube in a modification of the invention.

FIG. 6 illustrates a modification in which the joint at the helical seam 40 has just sufficient free play to permit some relative axial movement between adjacent convolutions of the strip forming the tube 18. In applications where the pipe 10 and outer tube 18 will be subjected to very different temperatures, and hence will undergo different thermal expansions and contractions, it is necessary to accommodate such differences to prevent excessive shear stresses in the insulation surrounding the pipe. For the purpose of maintaining a moisture-proof joint at the seam a pair of helical gaskets of neoprene 41, 42, or of other suitable rubber, are accommodated in the folds of the metal strip as shown. These gaskets are formed by feeding a pair of strips of neoprene with the metal strip 20 into the die 23 as the tube is formed. In the present example the strips are of circular cross section, but other shaped strips may be used.

Furthermore, in order to accommodate thermal contractions of the tube 18, the latter may be formed with corrugations, each corrugation extending helically along the tube parallel to the seam. In FIG. 6, such corrugations are shown at 43.

What we claim as our invention is:

1. A method of thermally insulating pipe, which comprises rotating the pipe at a uniform speed about a substantially horizontal axis while frothing a plastic foam mix onto the surface of the pipe progressively along its length, simultaneously forming a self-supporting and shape-retaining metal tube of larger dimeter than the pipe by continuously feeding a metal strip having parallel edges in a direction transverse to said axis, and continuously coiling the strip along a helical path while joining together the edges of adjacent convolutions of the strip to form a moistureproof helical seam, the tube being progressively extended coaxially with the pipe and progressively enveloping the surface of the pipe to define therewith an annular space, and maintaining the pipe at a temperature at which the mix constituents will react to form a foamed mass enveloping the pipe and filling the annular space between the pipe surface and the tube.

2. A method according to claim 1, wherein said moisture-proof helical seam is formed by folding and mechanically interlocking edge-overlapping convolutions of the strip continuously along the overlapping edges thereof.

3. A method according to claim 2, wherein the mix is a urethane foam mix.

4. A method according to claim 3, wherein the pipe is pretreated by applying to its surface a resinous or wax coating to prevent bonding of the urethane foam to said surface.

5. A method of thermally insulating pipe, which comprises continuously rotating the pipe about a substantially horizontal axis while advancing the pipe at a uniform speed longitudinally through a first position, frothing onto an upper region of the surface of the pipe at said first position a plastic foam mix so as to coat said surface progressively along its length, continuously forming at a second position adjacent to the first position a metal tube of larger diameter than the pipe, the self-supporting and shape-retaining metal tube being formed coaxially with the pipe by continuously feeding a metal strip having parallel edges in a direction transverse to said axis, and continuously coiling the strip along a helical path while joining together the edges of adjacent convolutions of the strip to form a moisture-proof helical seam, continuously advancing the tube at said uniform speed longitudinally from said second position to define between the pipe surface and the tube an annular space, and maintaining the pipe at a temperature at which the mix constituents will react to form a foamed mass enveloping the pipe and filling said annular space.

6. A method according to claim 5, wherein said moisture-proof helical seam is formed by folding and mechanically interlocking edge-overlapping convolutions of the strip continuously along the overlapping edges thereof.

7. A method according to claim 6, wherein the mix is a urethane form mix.

8. A method according to claim 7, wherein the pipe is pretreated by applying to its surface a resinous or wax coating to prevent bonding of the urethane foam to said surface.

9. A method according to claim 7, which includes the step of continuously winding a reinforcing web onto the pipe simultaneously with the application of the urethane foam mix onto said surface.

* * * * *